(12) United States Patent
Chattopadhyay et al.

(10) Patent No.: US 9,329,960 B2
(45) Date of Patent: May 3, 2016

(54) METHODS, SYSTEMS, AND COMPUTER READABLE MEDIA FOR UTILIZING ABSTRACTED USER-DEFINED DATA TO CONDUCT NETWORK PROTOCOL TESTING

(71) Applicant: Ixia, Calabasas, CA (US)

(72) Inventors: Tirtha Kumar Chattopadhyay, West Bengal (IN); Angshuman Dasgupta, Kolkata (IN)

(73) Assignee: IXIA, Calabasas, CA (US)

( * ) Notice: Subject to any disclaimer, the term of this patent is extended or adjusted under 35 U.S.C. 154(b) by 136 days.

(21) Appl. No.: 14/311,258

(22) Filed: Jun. 21, 2014

(65) Prior Publication Data
US 2015/0370675 A1    Dec. 24, 2015

(51) Int. Cl.
*G06F 11/263*    (2006.01)
*H04L 12/24*    (2006.01)
*H04L 12/26*    (2006.01)

(52) U.S. Cl.
CPC ............ *G06F 11/263* (2013.01); *H04L 41/145* (2013.01); *H04L 43/18* (2013.01)

(58) Field of Classification Search
CPC .............. G06F 11/263; G06F 11/2268; H04L 12/2697; H04L 12/26; H04L 43/18; H04L 41/145; H04L 12/24; H04L 43/0852; H04L 43/0864; H04L 43/0888; H04L 43/50; H04L 43/065
See application file for complete search history.

(56) References Cited

U.S. PATENT DOCUMENTS

| | | | | |
|---|---|---|---|---|
| 5,937,165 A * | 8/1999 | Schwaller | ........... | H04L 12/2697 709/224 |
| 6,914,892 B1 * | 7/2005 | Cooper | ............... | H04L 12/2697 370/338 |
| 8,204,497 B2 * | 6/2012 | Huber | ................. | H04L 12/2697 455/423 |
| 8,854,961 B1 * | 10/2014 | Cohen | .................... | H04J 3/0682 370/230.1 |
| 2002/0128811 A1 * | 9/2002 | Hoffmann | ........... | H04L 12/2697 703/21 |
| 2008/0294948 A1 * | 11/2008 | Forsbach | .................. | H04L 1/24 714/704 |
| 2009/0016227 A1 * | 1/2009 | Lin | ......................... | H04L 43/50 370/241 |
| 2013/0198569 A1 * | 8/2013 | Eidelman | ............ | G06F 11/2268 714/32 |

OTHER PUBLICATIONS

"Wireshark," Wikipedia, http://en.wikipedia.org/wikiWireshark, pp. 1-5 (Aug. 7, 2014).

* cited by examiner

*Primary Examiner* — Nadeem Iqbal
(74) *Attorney, Agent, or Firm* — Jenkins, Wilson, Taylor & Hunt, P.A.

(57) ABSTRACT

Methods, systems and computer readable media for utilizing abstracted user-defined data to conduct network protocol testing are disclosed. According to one aspect, the subject matter described herein comprises a method that includes receiving, by a test system abstraction (TSA) module from a device under test (DUT), a packet containing a command that is associated with a native protocol and converting the command included in the received packet into a TSA protocol command. The method further includes processing the TSA protocol command at a TSA engine module that is provisioned with at least one instruction sequence enabling the TSA engine module to emulate a network test device and generating, by the TSA engine module, a TSA protocol command response in accordance with protocol behavior specified by the at least one instruction sequence.

20 Claims, 7 Drawing Sheets

METHODS, SYSTEMS, AND COMPUTER READABLE MEDIA FOR UTILIZING ABSTRACTED USER-DEFINED DATA TO CONDUCT NETWORK PROTOCOL TESTING

TECHNICAL FIELD

The subject matter described herein relates to testing network systems and devices. More particularly, the subject matter described herein relates to systems, methods, and computer readable media for utilizing abstracted user-defined data to conduct network protocol testing.

BACKGROUND

At present, the protocol logic of most network test applications are implemented using compiled programming languages, such as C. Notably, these network test applications are developed based on specific needs that require the support of specific application or communication protocols. Moreover, the protocol logic may be embedded in the network test application in such a manner that requires significant and continuous development efforts for each additional protocol to be supported and tested. More specifically, since modern networks are required to utilize and accommodate a continuously increasing number of protocols, network administrators are repeatedly conducting expensive development cycles that are directed to constructing the required network test applications, each of which is based in a separately compiled and/or scripted language environment.

Accordingly, there exists a need for systems, methods, and computer readable media for utilizing abstracted user-defined data to conduct network protocol testing.

SUMMARY

Methods, systems and computer readable media for utilizing abstracted user-defined data to conduct network protocol testing are disclosed. According to one aspect, the subject matter described herein comprises a method that includes a method that includes receiving, by a test system abstraction (TSA) module from a device under test (DUT), a packet containing a command that is associated with a native protocol and converting the command included in the received packet into a TSA protocol command. The method further includes processing the TSA protocol command at a TSA engine module that is provisioned with at least one instruction sequence enabling the TSA engine module to emulate a network test device and generating, by the TSA engine module, a TSA protocol command response in accordance with protocol behavior specified by the at least one instruction sequence.

The subject matter described herein may be implemented in hardware, software, firmware, or any combination thereof. As such, the terms "function", "node" or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to systems, methods, and computer readable media for utilizing abstracted user-defined data to conduct network protocol testing. Reference will now be made in detail to exemplary embodiments of the presently disclosed subject matter, examples of which are illustrated in the accompanying drawings. Wherever possible, the same reference numbers will be used throughout the drawings to refer to the same or like parts. Various embodiments of the present subject matter are disclosed and described herein.

In some embodiments, a network test system may be configured to utilize abstracted user-defined data, such as test system abstracted (TSA) instruction sequences, to create an emulated network device that is used to test at least one device under test (DUT). Notably, the generated emulated network device may be configured such that the emulated network device is capable of being re-used to test additional DUTs, all of which may employ different communication protocols and/or application protocols. For instance, a test network administrator or other user may design a specific protocol behavior associated with a particular emulated network device by generating abstracted user-defined data (e.g., TSA instruction sequence) that is ultimately provisioned into an abstraction engine module contained within the emulated network device. In some embodiments, the abstraction engine module may be configured to process the abstracted user-defined data and subsequently function in accordance with the specified protocol behavior at runtime. Specifically, the abstracted user-defined data may enable the abstraction engine module to send and/or receive specific network packets, modify attributes of received packets, and re-send packets in a manner similar to other network test (or management) applications per the designed protocol behavior.

Figure 1:
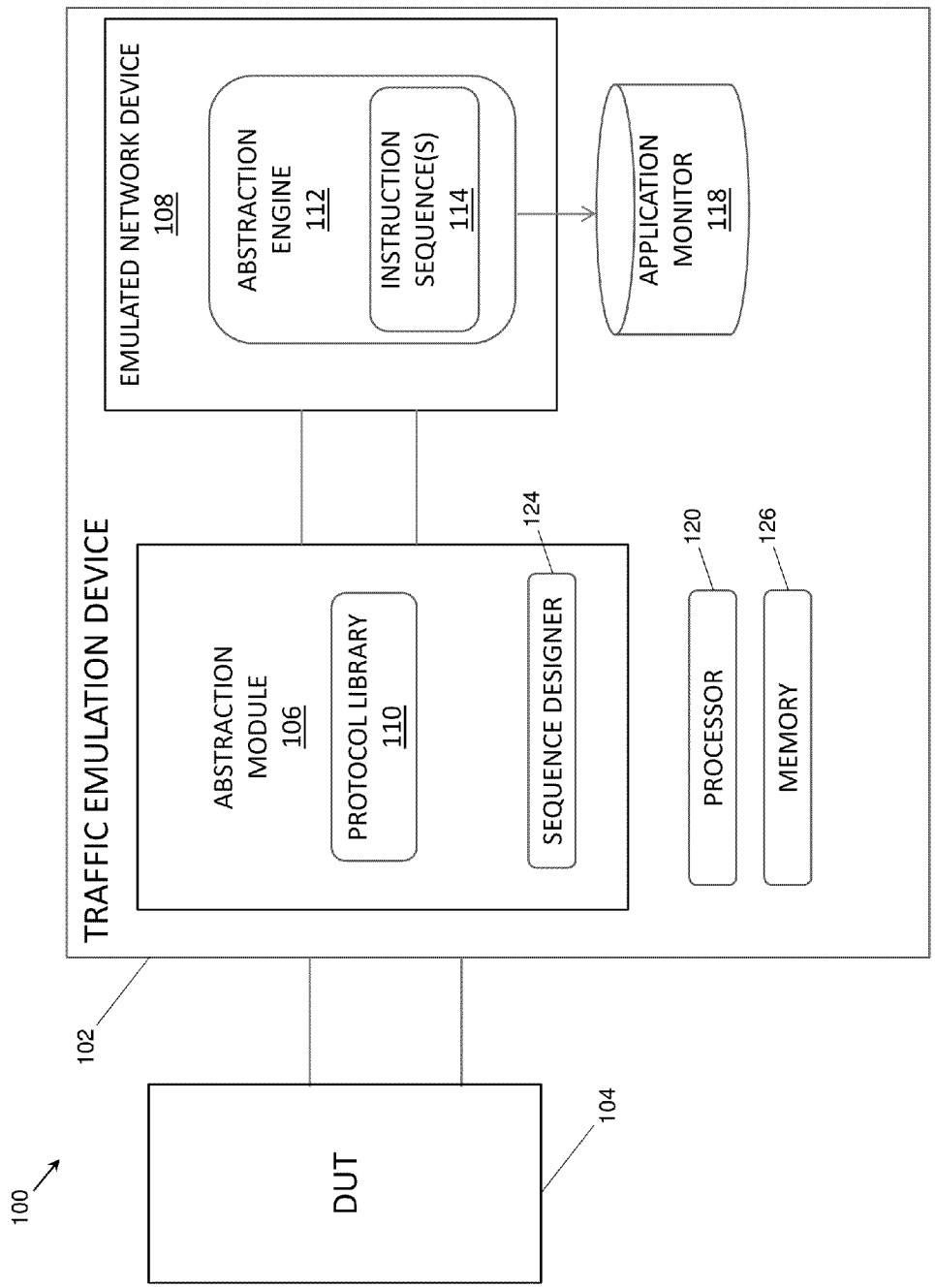
FIG. 1 is a block diagram illustrating an exemplary system for utilizing abstracted user-defined data to conduct network protocol testing according to an embodiment of the subject matter described herein.

FIG. 1 is a block diagram illustrating an exemplary architecture for a test simulation system 100 according to an embodiment of the subject matter described herein. Referring to FIG. 1, system 100 includes a traffic emulation device 102 (e.g., a traffic emulator) that is communicatively connected to a DUT 104, or in some instances, a system under test (SUT). In some embodiments, DUT 104 may include a serving gateway (SGW), a packet data network gateway (PGW), a firewall device, a router device, or any device or system that may benefit from high throughput traffic simulation testing. In some embodiments, DUT 104 may be configured to communicate with traffic emulation device 102 via a native communication protocol. DUT 104 may also be communicatively connected to traffic emulation device 102 via a wired or wireless connection that facilitates the transfer of any packet traffic between the two devices. In some embodiments, traffic emulation device 102 may be communicatively connected to DUT 104 via a border gateway protocol (BGP) and/or transmission control protocol (TCP) connection. In addition, traffic emulation device 102 may send packet data to DUT 104 via a transmission test port (not shown) and may receive packet data from DUT 104 via a receive test port (not shown). In some embodiments, traffic emulation device 102 may include a hardware-based device or equipment configured to generate and send packet traffic to DUT 104 for load testing purposes. Moreover, traffic emulation device 102 may host and/or support a test system abstraction (TSA) module 106 and an emulated network device 108, which includes a TSA engine module 112. In some embodiments, abstraction module 106 may be utilized to perform a number of translation and/or conversion procedures on the native protocol traffic received from DUT 104. In some embodiments, modules 106 and 112 may cooperatively perform a number of processing functions within traffic emulation device 102 prior to sending any response traffic to DUT 104. The aforementioned processing functions performed via modules 106 and 112 are described in greater detail below. In some embodiments, traffic emulation device 102 may also include an application monitor module 118 that may comprise a database element for collecting and storing output activity of a network test application executed by emulated network device 108. Application monitor module 118 may also comprise a graphical user interface element that is used to display the output activity to a user. In some embodiments, the collected output activity may include recorded packet capture information.

In some embodiments, traffic emulation device 102 may include a processor 120. Processor 120 may include a central processing unit (CPU), a microcontroller, or any other hardware based processing unit that configured to manage and execute modules 106 and 112 in traffic emulation device 102. Processor 120 may also be configured to access memory 126 and various specialized units, circuits, software and interfaces for providing the functionality and features described herein. In some embodiments, traffic emulation device 102 may be designated to function as either a client entity or a server entity. In some embodiments, memory 126 can include random access memory (RAM), read only memory (ROM), optical read/write memory, cache memory, magnetic read/write memory, flash memory, or any other non-transitory computer readable medium. In some embodiments, processor 120 and memory 126 be used to execute and manage the operation of abstraction module 106 and abstraction engine module 112.

In some embodiments, a user may provision TSA engine module 112 with user-defined data, such as at least one instruction sequence which enables TSA engine module 112 to emulate a network test device. Specifically, TSA engine module 112 may be configured to utilize an abstracted instruction sequence to develop and operate a "generic" network test application (e.g., firmware) that may be used to test packet traffic associated with any network protocol type. Prior to forwarding TSA engine module 112 with abstracted packet traffic from a DUT or SUT, abstraction module 106 needs to generate an abstracted instruction sequence that is recognized by TSA engine module 112. The resulting abstracted instruction sequence utilized by TSA engine module 112 may be used to establish and/or control a pre-compiled network test application that is executed by emulated network device 108.

In some embodiments, an instruction sequence comprises a plurality of instructions arranged in a specified order or sequence. An instruction sequence can be designed in a manner that defines the expected protocol behavior of emulated network device 108 during the testing of DUT 104 or an SUT. The native protocol instruction data used to generate an instruction sequence can be represented in many different forms, including data that is converted and/or subsequently used. For example, captured packet data (e.g., Wireshark® captured data) can be converted and used by the disclosed subject matter. As used herein, a native protocol instruction comprises an underlying command or message that is established in accordance with a particular protocol utilized by the DUT or SUT. Exemplary native protocol instructions include, but not limited to, a Send Packet instruction (e.g., used for designing and sending a packet), a Modify Packet instruction (e.g., used to modify received packets if the instruction sequence is designed to receive packets using a filter), a Transmission Control Protocol (TCP) Operation Start instruction (e.g., used to a initiate a TCP session), a TCP Operation End instruction (e.g., used to a terminate a TCP session), a Wait instruction (e.g., used to delay the execution of subsequent instructions at a specific time or after a predefined duration), a Log instruction (e.g., used to record monitored activities to a log), a Calculate instruction, a Send Statistic instruction, and the like.

In some embodiments, the instruction sequence may also include either a blocking instruction sequence or a non-blocking instruction sequence. For example, a blocking sequence comprise a sequence in which emulated network device 108 waits for the execution of an abstracted instruction sequence to complete before conducting any further instruction sequence processing. Notably, this course of action is required in order to conduct stateful behavior. Similarly, the blocking instruction sequence may also contain a filter that may include criteria that can be used to identify certain packets. In some embodiments, an instruction sequence may also contain one or more nested sequences depending on the requirement of the designed protocol behavior.

Figure 2:
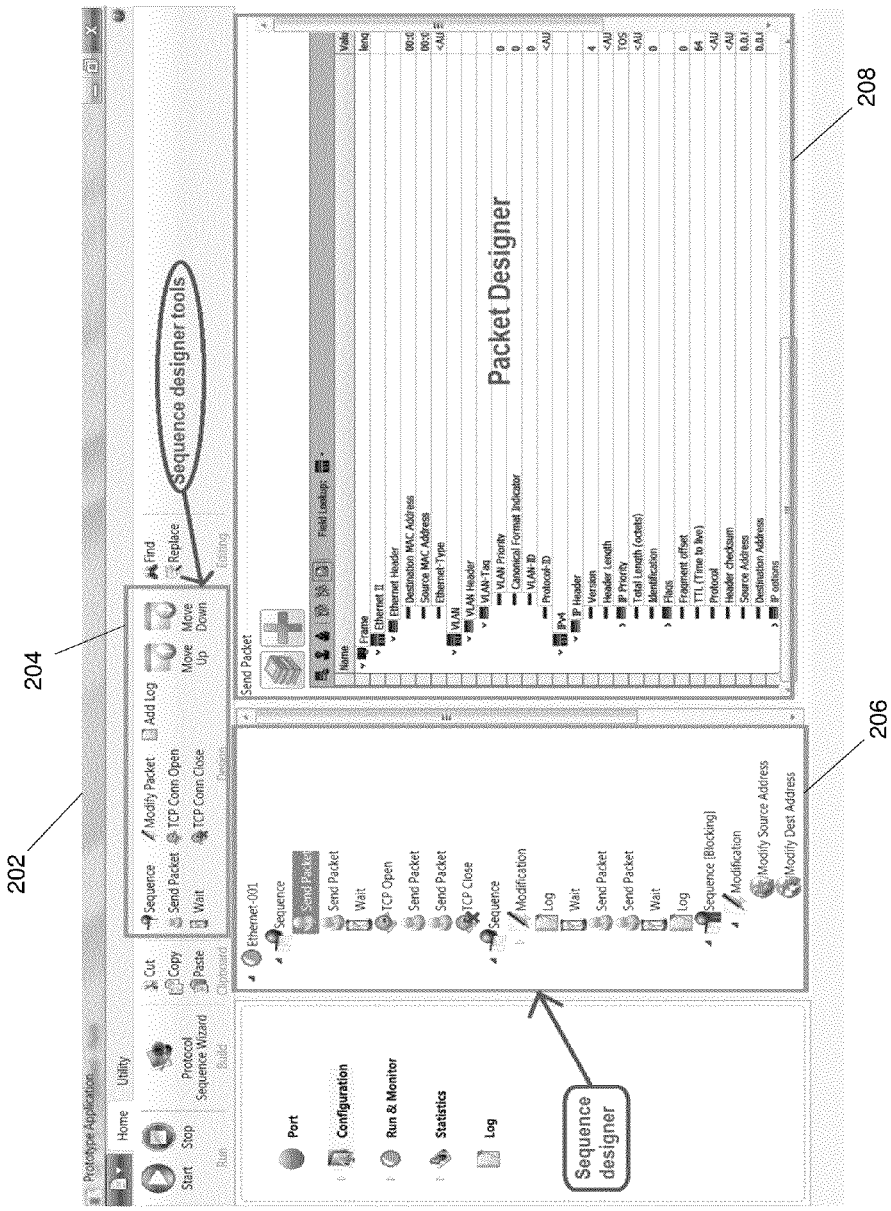
FIG. 2 is an illustration of an exemplary graphical user interface display for generating native protocol instruction sequences using a packet library according to an embodiment of the subject matter described herein.

In some embodiments, a user may utilize a sequence designer module 124 to design and manage the aforementioned instruction sequences. In some embodiments, sequence designer module 124 may enable a user, via a graphical user interface (GUI), to design and/or modify the packets included in an instruction sequence. Specifically, a GUI associated with sequence designer module 124 enables a user to modify such things as the header content and the payload content of the packets individually or in an existing instruction sequence. FIG. 2 depicts a screen display of an exemplary GUI 202 that may be used to design packets of an instruction sequence associate with an initial native communication or application protocol (e.g., a non-abstracted protocol). In some embodiments, GUI 202 may include a sequence designer toolbar 204 that can be used to perform a number of actions/functions related to the design and management of an instruction sequence. In some embodiments, GUI 202 may also include a sequence designer interface 206 that may be used to display and/or select various instructions included in one or more sequences. For example, sequence designer interface 206 may be utilized to select a Send Packet instruction, the details of which are displayed via packet designer interface 208. Notably, packet designer interface 208 can be utilized to design and/or modify the header content and the payload content of a packet by editing data fields of a selected packet as shown in FIG. 2.

Figure 3:
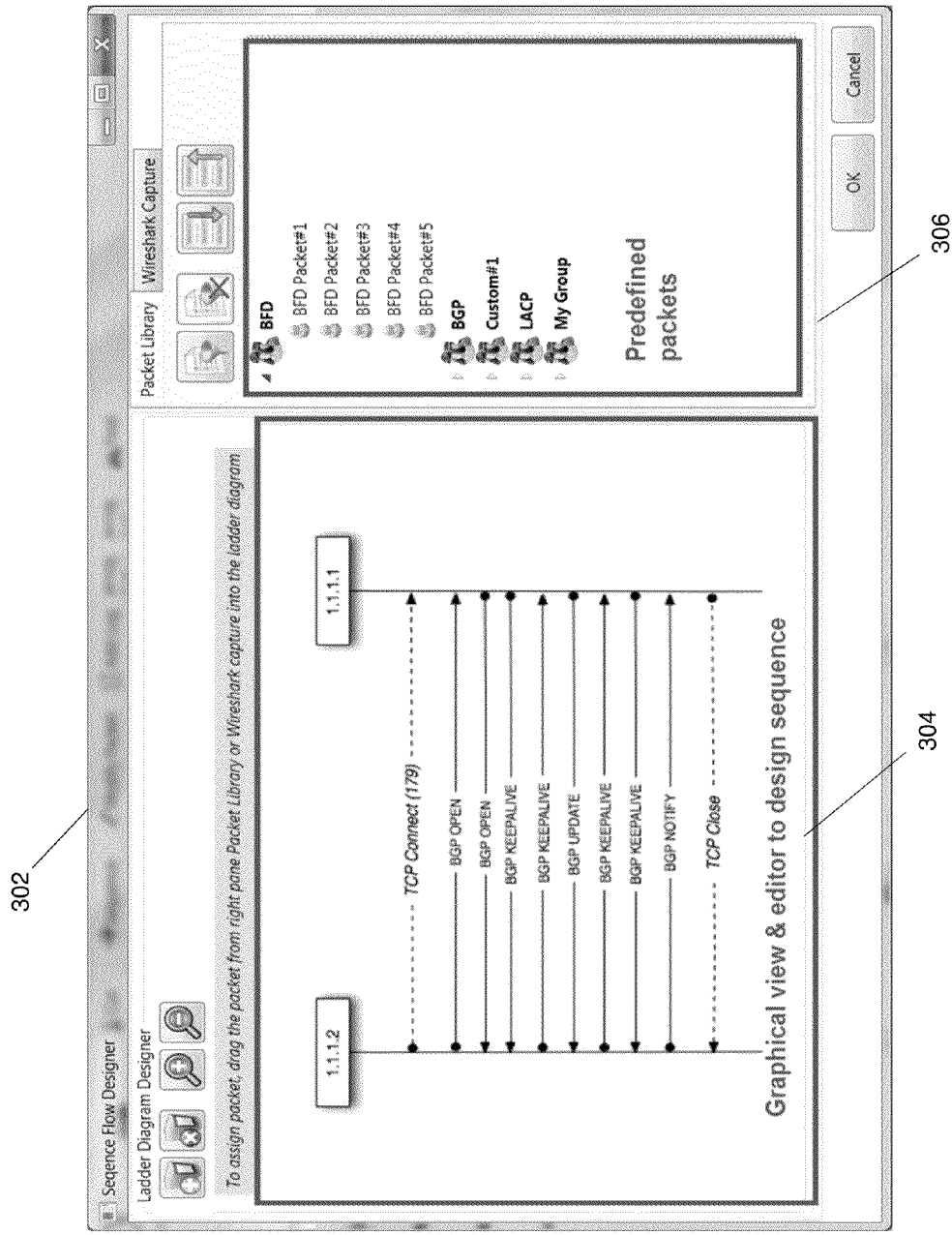
FIG. 3 is an illustration of an exemplary graphical user interface for generating native protocol instruction sequences using imported packet capture data according to an embodiment of the subject matter described herein.

In some embodiments, sequence designer module 124 may also be configured to receive a plurality of packets associated with a particular non-abstracted protocol. Notably, a user may provide sequence designer module 124 with a large number of packets, such as from a packet capture application or a saved configuration file, in order to generate a sequence instruction flow via a GUI associated with traffic emulation device 102. For example, FIG. 3 depicts a screen display of an exemplary GUI 302 that may be used to design a non-abstracted sequence instruction flow. In some embodiments, GUI 302 may include a ladder diagram interface 304 and a packet library interface 306. A user may utilize packet library interface 306 to select at least one predefined packet from a plurality of predefined packets (e.g., saved configuration file(s)) to be applied to ladder diagram interface 304. For example, a user may assign one or more packets to ladder diagram interface 304 by selecting said one or more packets displayed in packet library interface 306, which may be configured to store and manage packets associated with a number of different communication protocols (e.g., bidirectional forwarding detection (BFD) protocol, border gateway protocol (BGP), link aggregation control protocol (LACP), etc.). Packet library interface 306 may also allow a user to create folders to store various packets together irrespective of a packet's associated communication protocol.

After selecting the one or more packets to be included in an instruction sequence, a user may the "drag" the selected packet(s) from packet library interface 306 to ladder diagram interface 302 via GUI 302. Specifically, a copy of a previously used and/or previously saved packet may be selected from packet library interface 306 and strategically inserted into the non-abstracted instruction sequence flow (e.g., designed dialog flow) depicted in ladder diagram interface 304. After the instruction sequence flow in ladder diagram interface 304 is constructed, abstraction module 106 may utilize protocol library module 110 to convert or translate the instruction sequence into an abstracted instruction sequence that is recognizable by abstraction engine module 112. For example, protocol library module 110 may include a database structure that establishes mappings between instructions, messages, and commands associated with various communication protocols that are native to DUT 104 (and other DUTs, SUTs, etc.) and the corresponding instructions, messages, and commands associated with the TSA protocol recognized by abstraction engine module 112. For example, a TSA protocol "WAIT" command may be mapped to each of a plurality of non-abstracted "WAIT" commands in different protocols.

After processing at abstraction module 106 is completed, the non-abstraction instruction sequence may be forwarded to TSA engine module 112 for execution (as shown as instruction sequence 114 in FIG. 1).

In some embodiments, sequence designer module 124 may be configured to generate one or more non-abstracted instruction sequence flows from a plurality of imported packets. For example, sequence designer module 124 may be adapted to receive a saved configuration file or an imported packet capture file. Notably, a user may utilize GUI 402 to facilitate the importing of a packet capture file, such as a WIRESHARK® capture file. For example, interface window 404 depicts the contents of an exemplary WIRESHARK® capture file which may be provided in part or in its entirety to sequence designer module 124. Sequence designer module 124 may utilize protocol library module 110 (as described above) to generate a TSA protocol command for each of the selected packets from the imported packet capture file (and dragged to the ladder diagram interface).

Regardless of the manner in which the instruction sequence is generated, sequence designer module 124 either forwards the non-abstraction sequence to TSA engine module 112 for immediate use or to memory 126 for storage and subsequent use. If forwarded to TSA engine module 112, the abstracted instruction sequence may be utilized to emulate one or more network devices for the purposes of a test simulation. For example, TSA engine module 112 may be operable to receive and interpret the received abstracted instruction sequence 114 and subsequently execute a state change that is based on the protocol behavior set forth by instruction sequence 114. In some embodiments, TSA engine module may utilize instruction sequence 114 to formulate a generic or abstract network test application (which is executable by TSA engine module 112 and/or processor 120) that comprises application logic data that defines the aforementioned protocol behavior.

Notably, the disclosed subject matter permits a single "emulated network device" to be readily re-used to test multiple DUTs that employ different communication protocols. In some embodiments, TSA engine module 112 of emulated network device 108 may be implemented as a table-driven, highly configurable state machine. Notably, the state machine framework can be used to rapidly implement a wide variety of different network device emulations.

Once emulated network device 108 is provisioned with an abstracted instruction sequence 114 (and/or a network test application based on abstracted instruction sequence 114), emulated network device 108 may be in a condition to conduct traffic simulation tests with DUT 104 or an SUT. In some embodiments, DUT 104 may be configured to generate a plurality of native protocol packets as the subject of a traffic simulation test. Notably, one or more of the generated packets may include a command or message associated with a particular communication protocol or application protocol (e.g., protocol_x) that is native to DUT 104. Upon receiving a native protocol packet from DUT 104 via a local test port, traffic emulation device 102 may be configured to direct the received native protocol packet to abstraction module 106 for processing.

As described above, abstraction module 106 may include a protocol library module 110, which can include one or more database structures that establishes a plurality of conversion and/or translation rules between a generic TSA command set and one or more predefined communication protocol command sets. For example, protocol library module 110 may define mappings between commands associated with a particular communication protocol (e.g., protocol_x) and corresponding TSA protocol commands. Although only a single protocol library module 110 is shown, additional protocol library modules supporting and/or hosting additional application and communication protocols may be used without departing from the scope of the disclosed subject matter. Specifically, protocol library modules 110 may include a plurality of database structures configured to support an unlimited number of Layer 2-3 and Layer 4-7 communication protocols. For example, abstraction module 106 may utilize protocol library module 110 to access stored information associated with a received native "protocol_x" packet upon receiving said packet. In some embodiments, protocol library module 110 can be configured to store certain information associated with the native "protocol_x" packet and subsequently generate (and/or convert to) an associated "abstracted" instruction or command, such as a TSA protocol command. In one embodiment, the abstracted instruction may be packetized and forwarded to emulated network device 108. By functioning in this manner, abstraction module 106 effectively translates or converts the aforementioned received native "protocol_x" packets into the abstracted commands that TSA engine module 112 can recognize. In some embodiments, abstraction module 106 may convert a native protocol packet into an equivalent abstracted packet that contains a TSA protocol command and/or message.

In some embodiments, the abstracted packet containing the TSA protocol command is then forwarded by abstraction module 106 to TSA engine module 112 in emulated network device 108. In some embodiments, TSA engine module 112 may comprise a state machine, such as a table-driven test sequence state machine. As used herein, a table-driven test sequence state machine refers to a state machine that utilizes a database structure that establishes mappings between predefined protocol behavior actions/responses and exemplary TSA protocol commands/messages. For example, TSA engine module 112 may be configured to execute a specific action in response to receiving a specific TSA protocol command. In some embodiments, TSA engine module 112 can be configured to utilize instruction sequence 114 to emulate one or more network devices for the purposes of the test simulation.

During the processing of a received TSA protocol command, the resulting change of state (i.e., in accordance with protocol behavior) may trigger TSA engine module 112 to generate a TSA protocol command response. The TSA protocol command response may be communicated to abstraction module 106 where the response is translated and/or converted using protocol library module 110 in a manner described above. For example, abstraction module 106 may utilize protocol library module 110 in order to convert and packetize the abstracted TSA protocol command received from abstraction engine module 112 into an equivalent command and/or message associated with the original protocol (e.g., protocol_x) native to DUT 104. A packet containing the native "protocol_x" command may then be communicated by abstraction module 106 to DUT 104. In some embodiments, it is appreciated that abstraction module 106 may send the native protocol packet to a different DUT (as opposed to DUT 104).

In some embodiments, traffic emulation device 102 may initiate the test of DUT 104. For example, TSA engine module 112 may be configured to generate and/or packetize a TSA protocol command that includes a command or message that is recognizable (e.g., compatible) to abstraction module 106. In some embodiments, the TSA protocol command can be generated based on the protocol behavior that is defined by the instruction sequence(s) 114 utilized by abstraction engine module 112. In some embodiments, instruction sequence 114 includes a sequence of test rules that are specified in an associated table-driven data structure that may be hosted by a rules database (not shown) in emulated network device 108. The TSA protocol command may be communicated to abstraction module 106 (e.g., via a packet) where the abstracted command is translated and/or converted using protocol library module 110 in a manner described above. For example, abstraction module 106 may utilize protocol library module 110 to convert the TSA protocol command into an equivalent command (e.g., a protocol_x command) associated with a native protocol that is recognized by DUT 104. In some embodiments, the recognizable command is included in a native protocol packet that is communicated to DUT 104 via a test port associated with traffic emulation device 102.

In some embodiments, DUT 104 may subsequently process the received packet and may respond with its own native protocol packet, which contains a native protocol-based command response. This native protocol packet generated by DUT 104 can be received via a test port of traffic emulation device 102. From the test port, the native protocol packet can be forwarded to abstraction module 106 for processing. In some embodiments, abstraction module 106 may utilize protocol library module 110 to subsequently generate and/or packetize an associated TSA protocol command or message. Thus, abstraction module 106 is configured to effectively translate and/or convert the contents of the native protocol packet into an abstracted packet containing an equivalent TSA protocol command and/or message. The TSA protocol command may then be sent to emulated network device 108. In some embodiments, the TSA protocol command may be subsequently processed by TSA engine module 112. For example, the TSA protocol command processed by TSA engine module 112 may generally trigger a state change that is based on the state rules contained in a rules database (not shown) of TSA engine module 112.

Figure 5:
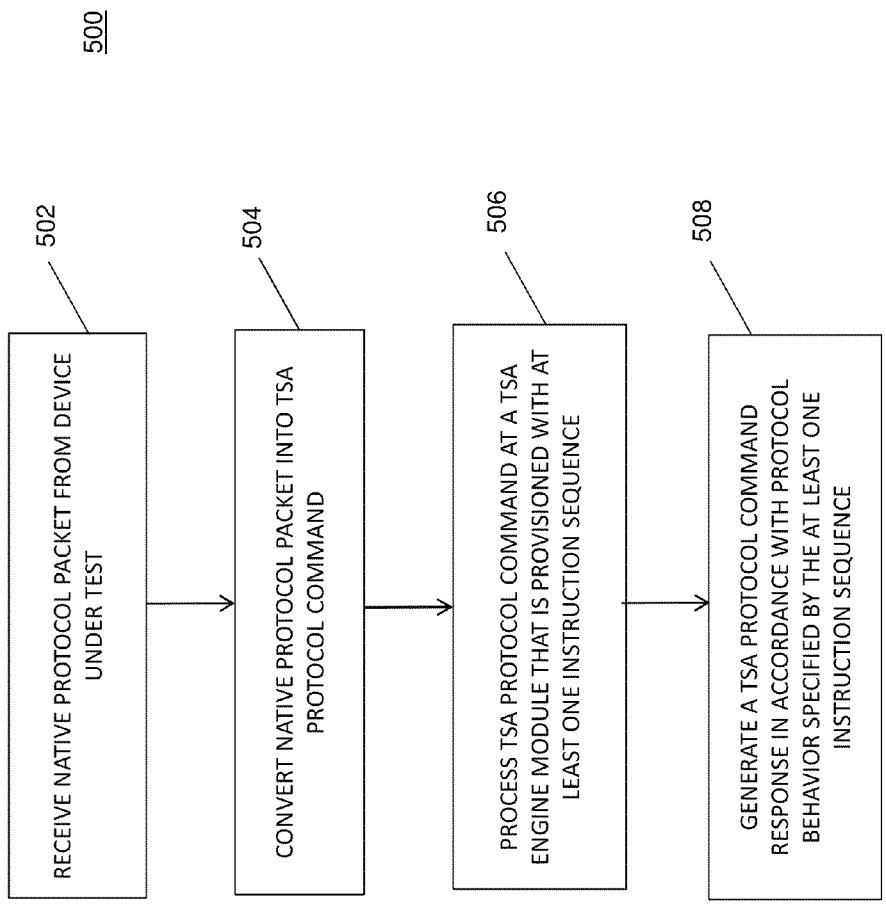
FIG. 5 is a flow chart illustrating an exemplary process for utilizing abstracted user-defined data to conduct network protocol testing according to an embodiment of the subject matter described herein.

FIG. 5 illustrates an exemplary method 500 for utilizing abstracted user-defined data to conduct network protocol testing. In step 502, one or more native protocol packets are received from a DUT or SUT. Using FIG. 1 as an additional reference, a plurality of packets associated with a protocol (e.g., protocol_x) native to DUT 104 is received, via a test port connection, by traffic emulation device 102. In some embodiments, each of the plurality of packets may include a command or message that requires processing by traffic emulation device 102. Upon receiving the packets from DUT 104, traffic emulation device 102 may be configured to direct the packets to abstraction module 106 to initiate the packet processing needed to conduct a network test.

In step 504, the received packet is converted into a TSA protocol command. In some embodiments, abstraction module 106 utilizes protocol library module 110 to convert (and/or translate) the command included in the received native protocol packet to a TSA protocol command that is recognizable by TSA engine module 112.

In step 506, the TSA protocol command is processed at a TSA engine module that is provisioned with at least one instruction sequence enabling the TSA engine module to emulate a network test device. In some embodiments, TSA engine module 112 processes the TSA protocol command sent by abstraction module 106 using a network test application that is based on instruction sequence 114.

In step 508, the TSA engine module generates a TSA protocol command response in accordance with protocol behavior specified by the at least one instruction sequence. In response to the processing conducted in step 506, TSA engine module 112 may generate a TSA protocol command response as deemed appropriate by the protocol behavior set forth by the network test application generated by at least one instruction sequence. Notably, TSA engine module 112 is configured in such a manner to process identical TSA protocol commands in the same manner. For example, a second TSA protocol command that is converted from a second command associated with a second native protocol command from a second DUT would be processed in the same manner as the original TSA protocol command (i.e., since the TSA protocol command is identical to the second TSA protocol command).

It will also be appreciated that exemplary method 500 is for illustrative purposes and that different and/or additional actions may be used. It will also be appreciated that various actions described herein may occur in a different order or sequence.

Figure 6:
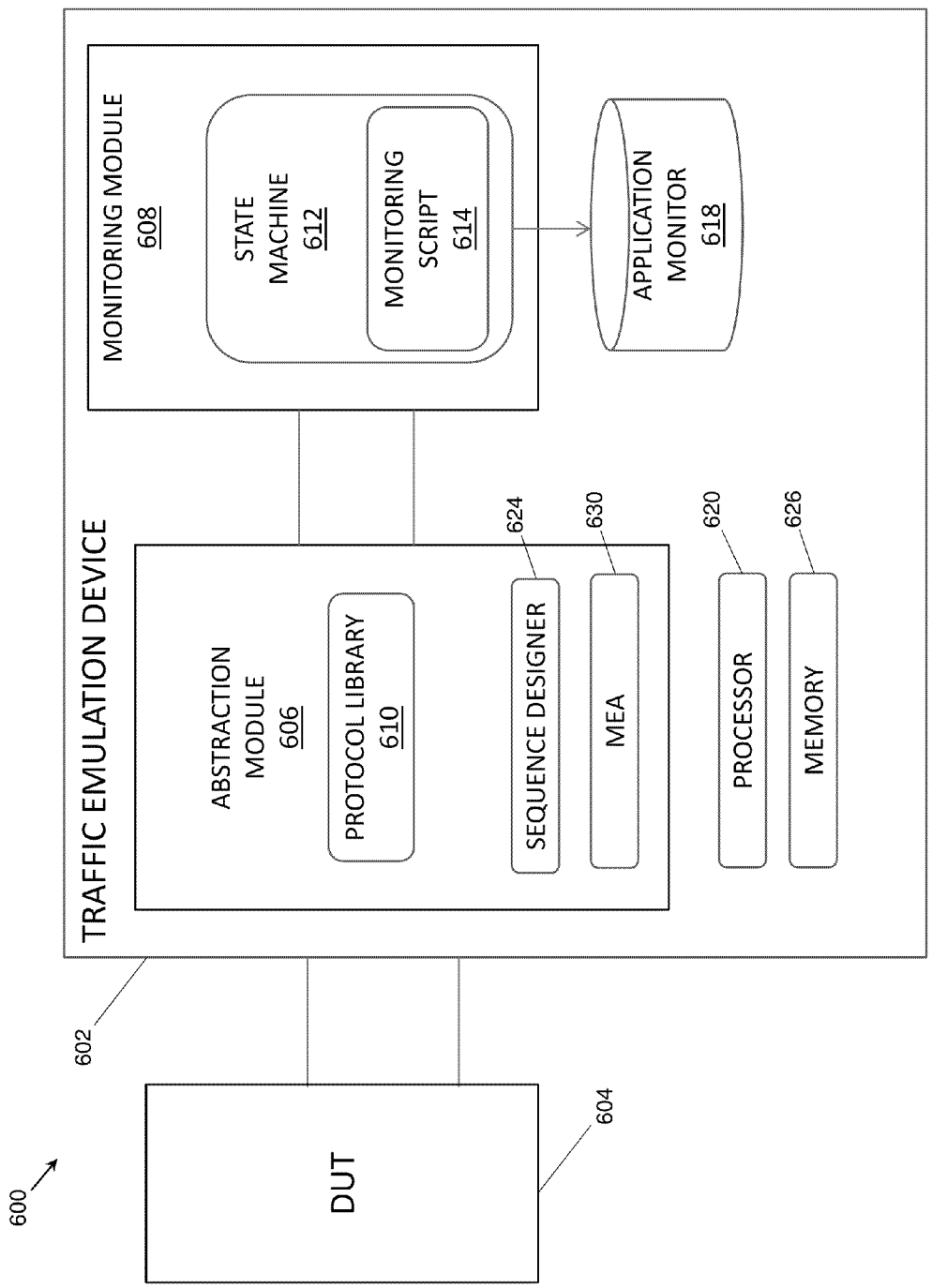
FIG. 6 is a block diagram illustrating an exemplary system for performing data-driven network protocol monitoring according to an embodiment of the subject matter described herein.

FIG. 6 is a block diagram illustrating an exemplary system 600 for performing data-driven network protocol monitoring. In some embodiments, a test system device 602 may include a monitoring embodiment test system that is configured to initiate a test of a DUT 604. Unless otherwise specified or defined, the components included in test system device 602 are capable of performing the same functions as the components in traffic emulation device 202 shown in FIG. 2. In one embodiment as depicted in FIG. 6, DUT 604 generates a packet that includes a command or message associated with a communication protocol or application protocol (e.g., protocol_x) that is native to DUT 604. The native protocol_x packet is received via a monitoring port (not shown) of test system device 602. From the aforementioned monitoring port, the native protocol_x packet is forwarded to an abstraction module 606 for processing.

In some embodiments, abstraction module 606 may include a protocol library module 610, which is configured to store information that maps commands and messages associated with the native protocol (among other protocols) and TSA protocol commands. Using the predefined mappings listed protocol library module 610, abstraction module 606 may be configured to subsequently generate an associated TSA protocol command. Such an action thereby essentially translates and/or converts the received native protocol_x packet (or at least the command/message contents within) into an equivalent TSA protocol command.

In some embodiments, the TSA protocol command is sent to an internal monitoring state machine module 612 associated with monitoring module 608. In some embodiments, state machine module 612 may comprise a monitoring script 614 or algorithm that is configured to generate abstracted instructions in response to receiving TSA commands. For example, state machine module 612 can be readily re-configured to support the performance of different actions in response to the detection of certain events or states caused by the receipt of abstracted instructions from abstraction module 606. Specifically, state machine module 612 may be configured to receive and interpret a TSA protocol command and to execute a state change that is based on the state rules provided by monitoring script 614. In some embodiments, a state change may cause state machine module 612 to perform an action, such as generating and transmitting an audible and/or visible alarm message, alert message, and/or notification message to some UI utilized by a user (e.g., which may be executed by monitoring event action module 630). In others embodiments, the action may involve system 602 generating and transmitting a control message to an element in the monitored network (e.g., DUT 604) such as a router, or a firewall, or other network device.

In FIG. 6, the resulting change of state may also cause a second TSA protocol command to be generated by state machine module 612. The second TSA protocol command may be communicated to abstraction module 606 where it is translated via protocol library module 610 in a similar manner described above. For example, abstraction module 606 may be configured to convert the received TSA protocol command into a packet containing an equivalent native protocol_x command or message that is recognizable by DUT 604. After the conversion is performed, abstraction module 606 may be configured to send the native protocol_x packet to DUT 604. In some embodiments, it is appreciated that abstraction module 606 may send the native protocol_x packet to a different DUT.

Figure 4:
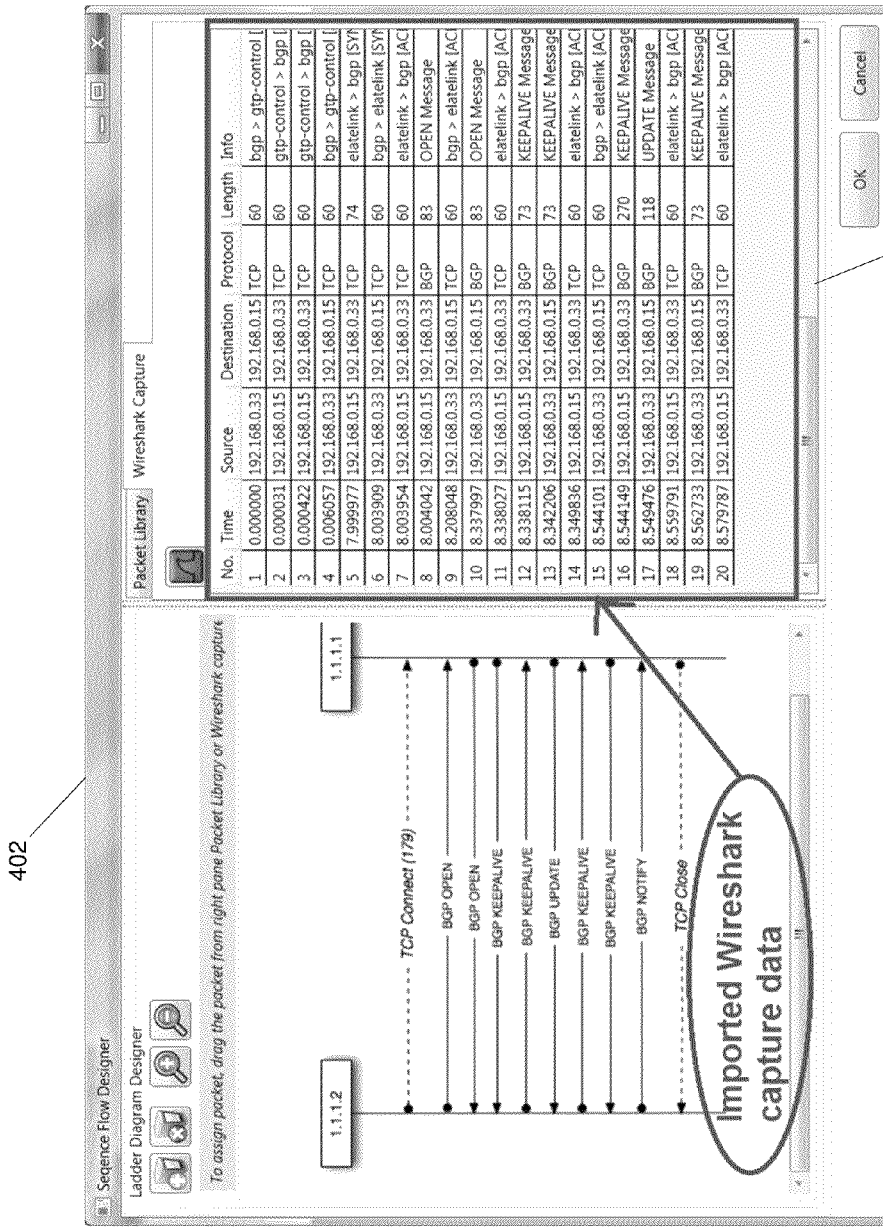
FIG. 4 is an illustration of an exemplary graphical user interface display for managing native protocol instruction sequences according to an embodiment of the subject matter described herein.
Figure 7:
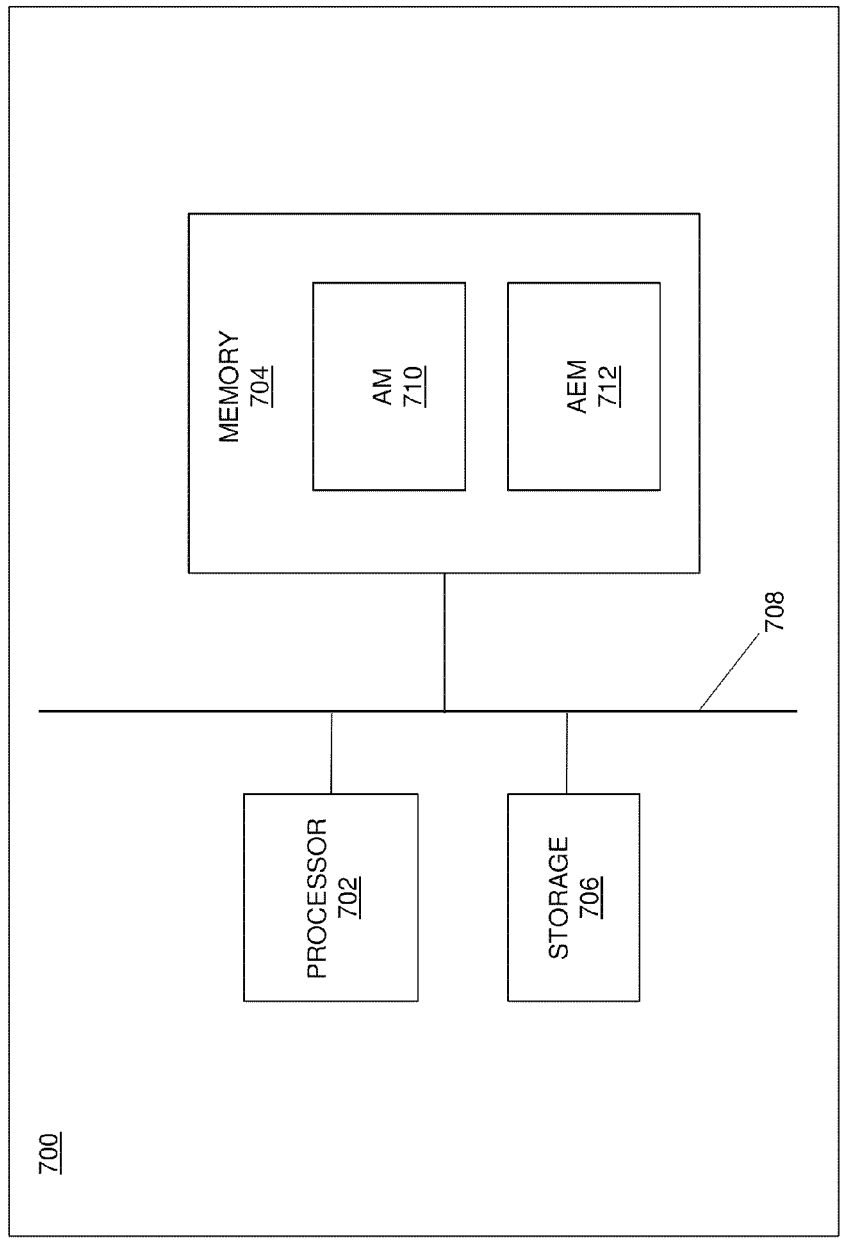
FIG. 7 is a block diagram of a general purpose computer system suitable for use in performing the functions described herein.

FIG. 7 depicts a high level block diagram of a general purpose computer system suitable for use in performing the functions described herein. As depicted in FIG. 4, system 700 comprises a processor 702, a memory 704, a storage device 706, and communicatively connected via a system bus 708. In some embodiments, processor 702 can comprise can comprise a microprocessor, central processing unit (CPU), or any other like hardware based processing unit. In some embodiments, an abstraction module 710 and abstraction engine module 712 can be stored in memory 704, which can comprise random access memory (RAM), read only memory (ROM), optical read/write memory, cache memory, magnetic read/write memory, flash memory, or any other non-transitory computer readable medium. In some embodiments, processor 702 and memory 704 can be used to execute and manage the operation of modules 710 and 712. In some embodiments, storage device 706 can comprise any storage medium or storage unit that is configured to store data accessible by processor 702 via system bus 708. Exemplary storage devices can comprise one or more local databases hosted by system 700.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for utilizing abstracted user-defined data to conduct network protocol testing, the method comprising:
    receiving, by a test system abstraction (TSA) module from a device under test (DUT), a packet containing a command that is associated with a native protocol;
    converting the command included in the received packet into a TSA protocol command;
    processing the TSA protocol command at a TSA engine module that is provisioned with at least one instruction sequence enabling the TSA engine module to emulate a network test device; and
    generating, by the TSA engine module, a TSA protocol command response in accordance with protocol behavior specified by the at least one instruction sequence.

2. The method of claim 1 comprising converting, by the TSA module, the TSA protocol command response into a response command associated with the native protocol.

3. The method of claim 1 wherein the at least one instruction sequence is provisioned on the TSA engine module via the TSA module.

4. The method of claim 1 wherein the at least one instruction sequence is used by the TSA engine to generate a network test application that establishes the protocol behavior.

5. The method of claim 1 wherein the TSA engine module includes a state machine configured to execute the at least one instruction sequence.

6. The method of claim 1 wherein the native protocol includes a communication protocol or an application protocol utilized by the DUT.

7. The method of claim 1 wherein the TSA module utilizes a protocol library module to convert the received packet from the DUT into the TSA protocol command.

8. The method of claim 1 wherein the TSA engine module is configured to process a second TSA protocol command that is converted from a second command associated with a second native protocol command from a second DUT in the same manner as the TSA protocol command, wherein the TSA protocol command is identical to the second TSA protocol command.

9. A system for utilizing abstracted user-defined data to conduct network protocol testing, the system comprising:
- an test system abstraction (TSA) module configured to receive, from a device under test (DUT), a packet containing a command that is associated with a native protocol and to convert the command included in the received packet into a TSA protocol command; and
- a TSA engine module configure to process the TSA protocol command that is provisioned with at least one instruction sequence enabling the TSA engine module to emulate a network test device and to generate a TSA protocol command response in accordance with protocol behavior specified by the at least one instruction sequence.

10. The system of claim 9 wherein the TSA module is further configured to convert the TSA protocol command response into a response command associated with the native protocol.

11. The system of claim 9 wherein the at least one instruction sequence is provisioned on the TSA engine module via the TSA module.

12. The system of claim 9 wherein the at least one instruction sequence is used by the TSA engine to generate a network test application that establishes the protocol behavior.

13. The system of claim 9 wherein the TSA engine module includes a state machine configured to execute the at least one instruction sequence.

14. The system of claim 9 wherein the native protocol includes a communication protocol or an application protocol utilized by the DUT.

15. The system of claim 9 wherein the TSA module is further configured to utilize a protocol library module to convert the received packet from the DUT into the TSA protocol command.

16. The system of claim 9 wherein the TSA engine module is further configured to process a second TSA protocol command that is converted from a second command associated with a second native protocol command from a second DUT in the same manner as the TSA protocol command, wherein the TSA protocol command is identical to the second TSA protocol command.

17. A non-transitory computer readable medium having stored thereon executable instructions that when executed by the processor of a computer control the computer to perform steps comprising:
- receiving, by a test system abstraction (TSA) module from a SUT, a packet associated with a native protocol;
- converting the received packet into a TSA protocol command;
- processing the TSA protocol command at a TSA engine module that is provisioned with at least one instruction sequence enabling the TSA engine module to emulate a network test device; and
- generating, by the TSA engine module, a TSA protocol command response in accordance with protocol behavior specified by the at least one instruction sequence.

18. The non-transitory computer readable medium of claim 17 wherein the at least one instruction sequence is provisioned on the TSA engine module via the TSA module.

19. The non-transitory computer readable medium of claim 17 wherein the at least one instruction sequence is used by the TSA engine to generate a network test application that establishes the protocol behavior.

20. The non-transitory computer readable medium of claim 17 wherein the TSA engine module is configured to process a second TSA protocol command that is converted from a second command associated with a second native protocol command from a second DUT in the same manner as the TSA protocol command, wherein the TSA protocol command is identical to the second TSA protocol command.

* * * * *